US012327289B2

(12) United States Patent
Gilet

(10) Patent No.: US 12,327,289 B2
(45) Date of Patent: Jun. 10, 2025

(54) SYSTEM FOR PROCESSING AND SUPPLY OF AN OPTIMAL BATCH OF HOMOGENEOUS GRADE HIDES FROM MULTIPLE TANNERIES WITH RANDOM QUALITIES

(71) Applicant: LESA—HIDEXE S.A, Erasme (LU)

(72) Inventor: Johann Wilhelm Gilet, Weiswampach (LU)

(73) Assignee: LESA—HIDEXE S.A., Erasme (LU)

( * ) Notice: Subject to any disclaimer, the term of this patent is extended or adjusted under 35 U.S.C. 154(b) by 586 days.

(21) Appl. No.: 17/637,462

(22) PCT Filed: Sep. 6, 2020

(86) PCT No.: PCT/EP2020/074886
§ 371 (c)(1),
(2) Date: Feb. 23, 2022

(87) PCT Pub. No.: WO2021/048033
PCT Pub. Date: Mar. 18, 2021

(65) Prior Publication Data
US 2022/0277407 A1 Sep. 1, 2022

(30) Foreign Application Priority Data
Sep. 12, 2019 (FR) ...................................... 1910088

(51) Int. Cl.
*G06Q 50/04* (2012.01)
*C14B 17/00* (2006.01)
(Continued)

(52) U.S. Cl.
CPC ........... *G06Q 50/04* (2013.01); *C14B 17/005* (2013.01); *G05B 19/188* (2013.01);
(Continued)

(58) Field of Classification Search
CPC ................. G06Q 50/04; G06Q 10/043; G06Q 10/06315; C14B 17/005; G05B 19/188; G05B 2219/35162
(Continued)

(56) References Cited

U.S. PATENT DOCUMENTS 4,199,255 A * 4/1980 Wilson ................. G01B 11/285
356/73
6,868,303 B1 * 3/2005 Chabirand Garçonnet ..................
B26F 1/38
700/135
(Continued)

FOREIGN PATENT DOCUMENTS

EP 2835430 B1 2/2015
GB 2265032 A 9/1993
(Continued)

*Primary Examiner* — Md Azad
(74) *Attorney, Agent, or Firm* — Jose Cherson Weissbrot

(57) ABSTRACT

A Tannery System (DT), for providing a Batch (LOkr) of Hides ($1ij$) with a homogeneous Grade (Gkr) from multiple Tanneries (Fi), intended to undergo a Transformation Stage (Se); (i) whose size is greater than the number of Hides having a Grade (Gkr) of each Tannery; and (j) that minimizes or maximizes the statistical numeric Constraint Parameter (PN) of a global statistical technical characteristic of all Hides in the Batch. It includes (a) a Computer Network (RL) that connects an online Platform (CL) to at least two Tanneries and their two Digitizing Scanners ($19i$); (b) Means for Filtering (25) by the Grade (G) all the Hides ($1ij$) available, to select the Combined-Subset (SCkr) of the Complying Fractions (FCi) of Hides from the Tanneries having the Grade (Gkr); (c) Means of Batch Optimization (26) for (i) performing Selections of Collections of combined Complying Sub-Fractions (Sim) of Complying Fractions, (ii) for determining for each Selection, the reached value of the Numerical-constraint Parameter, and, (iii) for
(Continued)

constituting the optimal Batch by the Selection which maximizes or minimizes the Numerical Constraint Parameter.

1 Claim, 9 Drawing Sheets

(51) Int. Cl.
    *G05B 19/18*     (2006.01)
    *G06Q 10/04*     (2023.01)
    *G06Q 10/0631*     (2023.01)
(52) U.S. Cl.
    CPC ..... *G06Q 10/043* (2013.01); *G06Q 10/06315* (2013.01); *G05B 2219/35162* (2013.01)
(58) Field of Classification Search
    USPC .......................................................... 700/171
    See application file for complete search history.

(56) References Cited

U.S. PATENT DOCUMENTS

2012/0307969 A1* 12/2012 Kraus-Guentner ..........................
    G01N 33/447
    73/866
2015/0348154 A1* 12/2015 Hein .................. G06Q 30/0621
    69/9
2017/0131703 A1* 5/2017 Gordon ................. C14B 17/005

FOREIGN PATENT DOCUMENTS

| WO | 2006027523 A1 | 3/2006 |
| WO | 2017083344 A1 | 5/2017 |

\* cited by examiner

FIG. 6

| Fi | Prod. | Date.Prod | Date.Grade | Date.Sold | Grade | Plat. | Date.Until | Ren. | POE | PSE |
|----|-------|-----------|------------|-----------|-------|-------|------------|------|-----|-----|
|    | 1i1   | 06/01/2019 | 13/01/2019 |          | Gi1   | Y     | 28/01/2019 | Y    | POi1 |    |
|    | 1i2   | 07/01/2019 | 14/01/2019 |          | Gi2   | Y     | 29/01/2019 | N    | POi2 |    |
|    | 1i3   | 08/01/2019 | 15/01/2019 |          | Gi3   | N     |            |      |     |    |
|    | 1i4   | 08/01/2019 | 15/01/2019 | 17/01/2019 | Gi4 | x     | x          | x    | x   | PSi4 |
|    | 1i5   | 10/01/2019 | 17/01/2019 | 18/01/2019 | Gi6 | x     | x          | x    | x   | PSi5 |
|    | ...   | ...        | ...        | ...        | ...   | ...   | ...        | ...  | ... | ... |
|    | 1ini  | 13/08/2019 | 20/08/2019 |            | Gini  | N     | 04/09/2019 | Y    | POini |  |

SYSTEM FOR PROCESSING AND SUPPLY OF AN OPTIMAL BATCH OF HOMOGENEOUS GRADE HIDES FROM MULTIPLE TANNERIES WITH RANDOM QUALITIES

TECHNICAL FIELD

The invention relates to the technical field of parametric optimization for the constitution of optimized combined batches, complying with a set of criteria imposed by the purchase request from buyers for a standardized requested batch of a transformed raw product.

On the one hand, the invention applies specifically to the case in which the requested batches are supplied by a multi-site industrial ecosystem, including a multitude of distant supplying factories from the same transformation industry, producing these products with random topological and/or geometric defects and quality.

On the other hand, the invention specifically relates to the field of transformation industries, in which the value in use and the request criteria for a batch of transformed raw products requested by a buyer must respect, in order to meet its need, a set of request criteria comprising at least three specification parameters specific to the buyer and therefore different for each request: a topological quality grade parameter, based on a topological quality norm; a volume parameter indicating the product quantity; but also, at least one complementary selection parameter, linked for example to the overall geometry of the products in the requested batch, or to the distribution of the supplying factories, or to an extensive variable (i.e. summable, such as weight) of products.

Furthermore, the invention relates specifically to industrial fields where the two variables, constituted by the volume parameter and by the requested complementary parameter, are linked and not independent from another. That is to say that the choice of the value of one of these two parameters influences the value of the other parameter; and that the freedom degree for the variables constituted by the parameters of the set of request criteria is lower than their number.

The main application industrial field of the invention is the tanning industry.

TECHNOLOGICAL PROBLEM TO BE SOLVED

In the field of transformation industries to which the invention applies, the request criteria for a batch of products by the buyers also generally have the following characteristics:
a. The batches requested by the buyers generally have a larger size than the factory stock of each supplying factory on its own in order to satisfy the 3 parameters of the request criteria. As a result, these transformation industries require the production supply to be pooled, in order to provide buyers with combined batches of products from a multitude of supplying factories brought together in an industrial production and sales ecosystem.
b. The three request specification parameters (grade, volume, and complementary) differ and vary over a wide spectrum for each buyer and for each request.
c. Buyers' needs and criteria, in terms of optimizing the requested batch, also vary across a wide spectrum.

Some buyers want to optimize the volume parameter and others the complementary parameter of their purchase request.

In the specific industrial context referred to above, the object of the invention, and the main technological problem that the invention aims to solve, is to provide a universal multi-site parametric optimization method, for the pooled constitution of a batch offered to buyers of transformed raw products which allows in a fast, economical, homogeneous and global manner:
a. For a very large number of buyers to supply requested batches that meet the broad spectrum of their grade, volume and complementary parameters; as well as their optimization criteria, by increasing their productivity and allowing tracing of the origin and quality of the acquired product batches; and,
b. For a very large number of supplying factories, to respond on a large scale in a pooled and homogeneous manner to the requests of buyers, while improving the turnover speed of their stock, their productivity, and the economic efficiency of their transactions.

TECHNICAL BACKGROUND

It is known from the prior art that companies or factories, transforming similar raw industrial products, such as hides and skins, offer for sale semi-finished products having random topological quality and geometry through an online trading platform. In reference to the tanning industry, in 2019, the following Business to Business (BtoB) web portals can be mentioned:
Leathermarkets.com
Alibaba.com at section/showroom/leather-raw-material
Indiamart.com at section/delhi/leather-raw-materials
Tradeindia.com at section/Leather-Leather-Products/Leather-Raw-Materials/
Go4worldbusiness.com at section/suppliers/raw-leather
Intracen.org at section/leatherline These prior art web portals are online trading platforms, where industrial buyers buy a batch from a specific supplying factory chosen on the site. But, according to the prior art, the supplying factories and the platform do not technologically cooperate in a network, around a trading platform, to automatically provide to buyers a combined batch having a homogeneous quality grade, the batches being constituted out of the combination of a plurality of product sub-batches originating from separate supplying factories.

It is known from the prior art to set a topological quality norm for a type of raw products. For example:
a. The "Guidelines for Grading of Hides and Skins by Quality" norm issued by the United Nations Industrial Development Organization, under reference US/RAF/88/100;
b. The "Leather—Grading of wet blue goat and sheep skins based on defects" norm issued by International Standard, under reference ISO 11457;
c. The "Standards Governing the Sale of North American Cattle Hides" norm adopted by the "United States Hide, Skin & Leather Association" in August 2014.

In class C14B of the International Patent Classification (IPC), there are many patents which describe optical devices for automatic quality control by scanner of the quality of tannery hides, to ensure in a specific factory image digitalization and processing for raw products being transformed in this factory; this being performed in order to identify, locate, and or classify defects.

It is known from the prior art, to locally carry out in the same factory, the control process of a topological criterion of a flow of transformed raw products, and to locally assign to these products a quality grade according to these topological criteria. Thus, U.S. Pat. No. 4,199,255 describes a device to be installed in a tannery, to rank hides by assigning them a grade linked to a norm, according to the distribution of their thickness measured automatically at determined locations.

It has long been known from the prior art to install control lines in tanneries in order to measure certain physical or topological characteristics of hides, and to allow classifying the hides according to their quality. Thus patent EP2835430B1 describes a tannery production control line comprising means for moving the hides to a succession of manual control stations, where an operator visually assigns a quality code to each of the hides. This manual control method and its variants is currently the most common in the tanning industry.

It is known to implement two remote industrial units cooperating with each other; a factory where products are scanned and a remote development center where product image processing is carried out. The patent WO2017083344A1 describes such a device, in which the development center also generates diagrams for positioning and cutting pieces inside the products, and sends them to the factory which is equipped with cutting equipment. This system does not include any trading platform and does not pool the production of batches having a uniform grade originating from a plurality of factories.

It is known to implement a computer process for managing the stock of combined goods in order to respond to orders. Patent GB2265032A thus describes a stock management program. It includes a goods database containing information as to whether each product is intended for sale as a single item or as combined products comprising a combination of a plurality of items. When the goods ordered are combined goods, the processing device checks the inventory master file to determine if there is a sufficient number of elementary goods in stock to fill the order quantity. The processing device performs a stock allocation and an update. This device does not relate to the production of batches of standardized raw products combined from a production having random quality coming from a multitude of factories.

It is known to implement a process for optimizing the geographical origin of products to respond to orders. Such a device is described in patent application US20190180231A1. This device does not relate to the production of batches of standardized products combined from a production having random quality coming from a multitude of factories.

It is known to implement a trading platform allowing transactions, to be carried out online, of products or services for a multitude of buyer requests. Such a device is described in patent application US20180260764A1 and relates to rail transport service applications. The platform's graphic interface is configured to present a plurality of customer-selectable options and is adapted to provide additional information to the customer in order to complete its online transaction. This device does not relate to the production of batches of standardized products combined from a production having random quality coming from a multitude of factories.

DISCLOSURE OF INVENTION

According to the invention the batches requested by the buyers are supplied by a multi-site industrial ecosystem, including a multitude of distant supplying factories from the same transformation industry, producing products having random topological and/or geometric defects and quality.

The described features solve the aforementioned technical problem. In its essential form, the method according to the invention is of the type comprising the following steps:

a. According to a norm-setting process, setting a topological quality norm, defining a standardized grading scale staggered according to several product grades, which is transmitted and applied in a unified manner to all factories in the system and to all buyers.

b. According to a factory stock management process, implemented at the level of each factory, setting, and dynamically recording the factory stock parameters, with reference to a factory identifier, the evolving multitude of identifiers of the products proposed for sale by the factory, depending on evolutions in the available factory stock.

c. According to a programmed digital grading process, dynamically determining the grade of each product offered for sale by each factory.

d. According to a global stock management process, the evolving multitude of all the grades for all the products offered by all the factories is dynamically recorded, with reference to all the stock parameters.

e. According to a request management process, purchase requests originating from a multitude of buyers are received and dynamically recorded, for the supply of requested batches, which must meet a set of request criteria, including in the form of an alphanumeric expression, at least one parameter for requested homogeneous grade, one complementary parameter, and one volume parameter.

f. According to a complying selection process, a compliant combined subset is extracted, made up of products complying with the requested grade, formed by the combination of a multitude of complying fractions of products of the requested grade, offered by the various factories from their factory stocks, with reference to their product identifiers and to the identifier of the supplying factories.

The essential and new particularity of the multi-site parametric optimization method according to the invention lies in the fact that, in addition in combination, following a purchase request from a buyer:

a. In addition to the buyer, among all of his request criteria, an optimization choice criterion is received, including an optimization parameter, by which the buyer indicates his choice: on the one hand of a numerical parameter of the constraint of the requested optimization, and on the other hand of a said second optimization constant. These two optimization choice parameters are set by the buyer in a complementary and exclusive manner from either the complementary parameter or the volume parameter of the purchase request.

b. Under-constraint parametric optimization is carried out by digital processing, of the selection of a combined offered batch optimized according to the set of request criteria, under constraint of the numerical constraint parameter to be optimized chosen by the buyer. To this end, a plurality of complying sub-fractions, extracted from some of the complying fractions of the combined subset, are selected and combined, optimally distributed among some of the plants.

To this end:

a. The multitude of variable and possible n-tuples, each consisting of a collection of elements formed of identifiers of variable products extracted from the combined subset, is used as optimization variable.
b. Two optimization constants are set: a first optimization constant equal to the requested grade, and the other second constant chosen according to the buyer's optimization parameter.
c. This parametric optimization is carried out by maximizing or minimizing the numerical constraint parameter chosen according to the optimization parameter, by varying the possible n-tuples of the optimization variable, and by determining for each n-tuple the reached value of the numeric constraint parameter.
d. The dimension n of the variable n-tuples, depending on the optimization choice parameter, is set by a dimensional conditional choice.
e. An offer is made to the buyer, of an optimized combined offered batch, by further submitting to him/her the reached numerical optimum, which is the solution to the optimized constraint numerical parameter, that is to say the minimum or the maximum reached by the constraint numerical parameter to be optimized.

BRIEF DESCRIPTION OF THE DRAWINGS

Reading the following detailed description of the invention, with reference to the accompanying drawings, reveals other features and advantages of the invention, according to an exemplary embodiment. In the drawings:

FIG. 6 is a schematic view of a tannery stock management operator screen interacting with the ecosystem of the tannery system according to the invention.

DETAILED DESCRIPTION

For a better understanding of the problem that the invention aims to solve, in conjunction with the attached drawings, the technical content and the detailed description of the present invention are set out below according to a preferred embodiment in the tanning industry, which does not limit the scope of its execution. The tanning industry features all the parameters of the technological field of the invention. The supplying transformation factories are tanneries. Semi-finished raw products are hides or skins, transformed over several stages. These raw products are exchanged between tanneries at each primary stage. The finished leather products are ultimately purchased and used by industrial integrators in the clothing, footwear, automotive, or furniture and decoration industries. The various components of the technological problem, and the solutions offered by the invention, as described below with reference to the tanning industry, replicate in a similar manner, in all industries transforming raw industrial products, objects of the invention, as described above.

Figure 1:
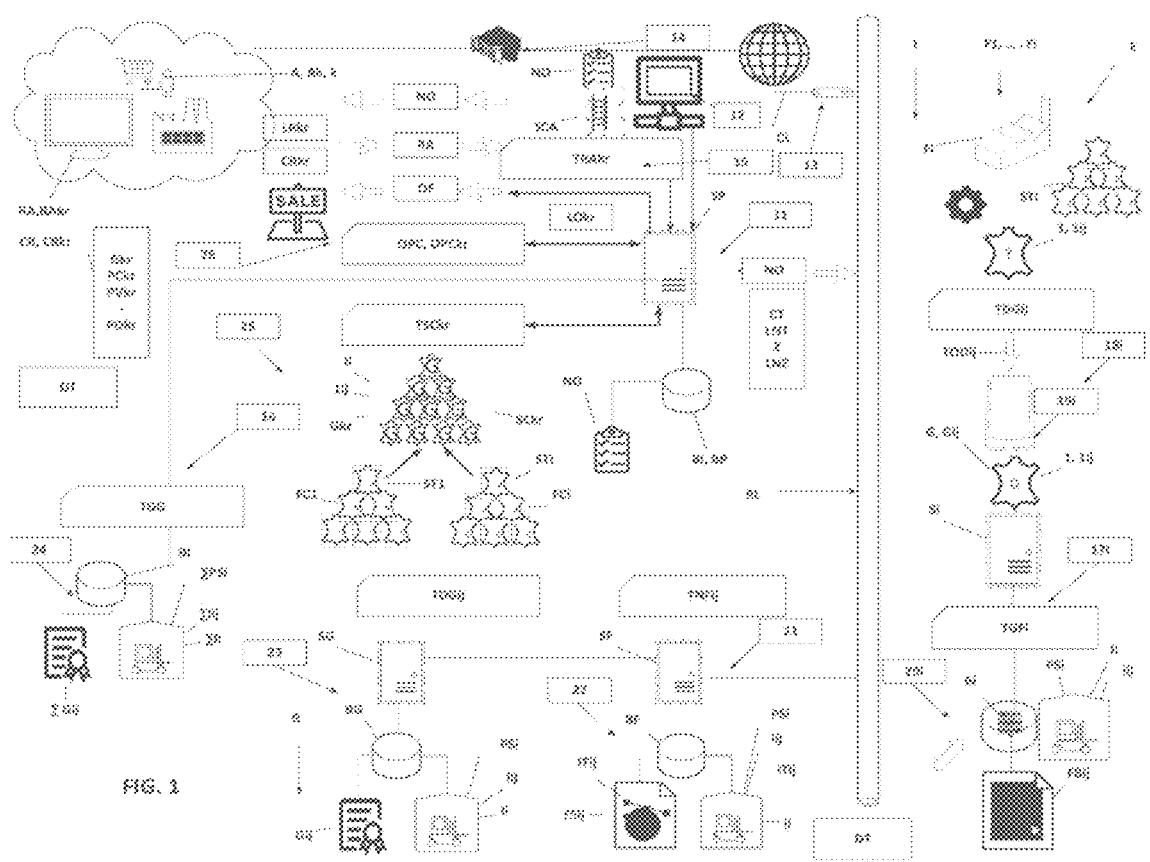
FIG. 1 is a schematic view of the means implemented by the method and a device according to the invention, in their general form.
Figure 2:
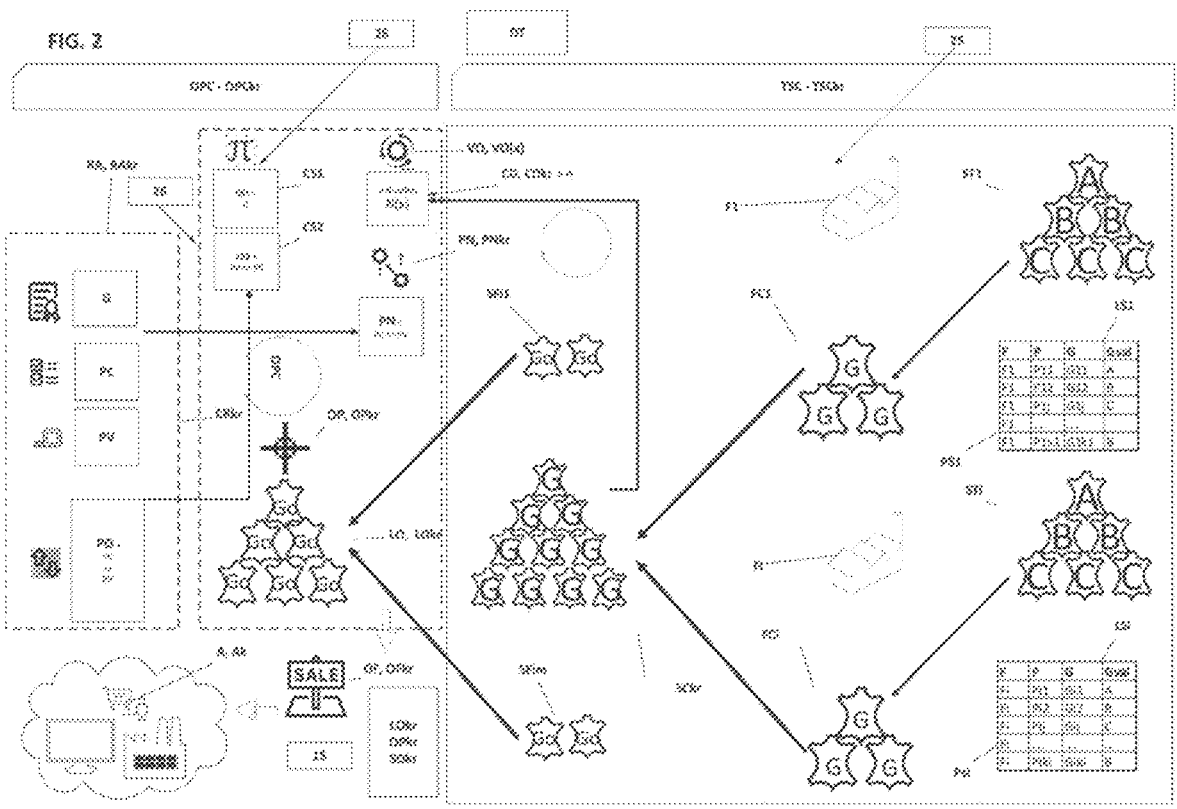
FIG. 2 is a detailed diagram of the different stages of the optimization process according to the invention, in its general form.

With reference to figures [FIG. 1] and [FIG. 2], an industrial tannery device (DT) implementing the method according to the invention, for the optimization of the constitution of product batches (LO, LOkr) from tanneries homogeneous in quality can be seen. Indeed, the implementation of the optimization method according to the invention is particularly efficient within an ecosystem (E) of a transformation industry (I) producing similar raw industrial products of random quality, having a flat sheet-like structure (SF). Such is the case in the tanning industry (I), where products are developed and supplied from a scattered production of hides/skins (1, 1ij) of random quality, made by a multitude of supplying tanneries (Fi) distant from another and spread over a large territory. The tanneries (Fi) are connected by computer network (RL) to a trading platform (CL) within an industrial ecosystem (E) of the tanning industry (I). The online trading platform (CL) thus ensures the offer (OF) for sale to buyers (A, Ak, k) of batches of the combined production of hides/skins (1, 1ij) from the tanneries (Fi), to satisfy the purchase requests (RA) from buyers (A).

The Internet online trading platform (CL), comprises a computer server of the platform (SP), and an inventory database (BI) of the platform connected to the computer server of the platform (SP), comprising in particular the list of characteristics of the hides/skins (1ij) of the tanneries, that are available for sale on the platform (CL).

The platform (CL) comprises standardization computer means and software (11), of the type comprising in particular an operator terminal (12) connected to the computer server of the platform (SP), to define alpha-numerically, to develop, and to record into a memory of the computer server of the platform (SP), a norm (NO) for the topological quality of tannery products (1) in the ecosystem (E). This norm (NO) defines a standardized grading scale (SCA) staggered according to several grades (G) of the tannery products (1,1ij). According to this norm (NO), the belonging of a product (1) to a grade (G) is set by objective topological quality criteria (CT), based on a standardized list of topological defects types (LNT) of products (1) (hides and skins), that can be identified and measured numerically. These defects are defined and differentiated by rules relating to defect shape and/or size, and/or on a standardized list of zones of interest (LNZ) of the products (1), which are objective and numerically distinguishable. The trace of a zone (LNZ) on a product (1) is defined by geometric criteria relating to the shape of the product (1), and in which the topological defects can be distributed.

The platform (CL) includes computer resources and software for putting the norm online (13), of the type allowing the provision to buyers (A) and to all tanneries (Fi) of the definition of the standardized norm (NO) used by all the ecosystem (E), via the Internet network (14).

The platform (CL) is equipped with computerized means for requests processing and software (15), configured to receive and record into the inventory database of the platform (BI), the purchase requests (RA, RAkr) originating from a multitude of buyers (Ak), for the supply of requested batches (LRkr) of tannery products (1) (hides and skins), as well as their request criteria (CR, CRkr) of the requested batch (LRkr). These request criteria (CRkr) include, in the form of an alphanumeric expression, at least three specification parameters, including the homogeneous grade parameter (Gkr) requested for the batch according to the uniform norm (NO), a complementary parameter (PCkr) for selection, and, a volume parameter (PVkr).

The platform (CL) is provided with computer resources and software for managing the global stock (16) of tannery products (1) (hides and skins), connected to the computer server of the platform (SP). They are of the type allowing the implementation of a global stock management process (TGG), in order to dynamically gather and record the evolving multitude of all grades ($\Sigma$Gij), and of all identifiers ($\Sigma$Iij) of all products ($1ij$) offered onto the platform (CL) by each tannery (Fi) into the inventory database (BI) of the platform, with reference to all the stock parameters ($\Sigma$PSi) of the tanneries (Fi).

The industrial ecosystem (E) also includes a multitude of remote tanneries (F1, . . . , Fi). At least two tanneries (Fi) are remote from each other, and remote from the platform (CL).

As will be described later with reference to figures [FIG. 8] and [FIG. 9], the tanneries (Fi) ensure the transformation with random quality and the sale offer on the platform (CL) of tannery products ($1ij$), in particular hides and skins, at one of the four main transformation stages (Sa, . . . , Sz) between raw hides originating from slaughterhouses and the finished leather ready to be used by industrial integrator buyers (A, Ak). A multitude of factory computer servers (S1, . . . , Si) are associated with each of the independent tanneries (Fi). A multitude of factory inventory databases (Bi), located in memory of the factory computer server (Si), are associated with each independent tannery (Fi). Factory stock management computer means and software (17$i$), linked to the factory computer server (Si) of each tannery (FI), are configured to dynamically set and record by a factory stock management process (TGFi), the stock parameters (PS1, . . . , PSi) of the tanneries (Fi), according to the evolution in their available factory stock (STi). These stock parameters (Psi) include a factory identifier (Ii), and the evolving multitude of product identifiers (Iij) offered for sale by each tannery (Fi). Each tannery (Fi) is equipped with computer means and software for producing primary images (18$i$) of the tannery products ($1ij$), including a multitude of image digitizing scanners (19$i$), located in the production zone of each of the tanneries (Fi) in the ecosystem (E). The computer means and software for producing primary images (18$i$) are connected to the factory computer server (Si), and equipped with means for carrying out the automatic digital optical acquisition (TODij) of a raw primary image file (FBij) by scanning each of the products ($1ij$) to be graded from the tannery (Fi). Computerized means for storing primary images and software (20$i$) are configured to record the primary image files (FBij) of the products ($1ij$) of each tannery (Fi) in the ecosystem (E) into the memory of the factory inventory database (Bi), with reference to stock parameters (Psi).

A computer network (RL) for digital linking, of the Internet type or equivalent thereto, connects the platform computer server (SP) to the multitude of factory computer servers (S1, . . . , Si) of each supplying tannery (Fi), and buyers (A, Ak) to build a digitally interactive tannery industrial ecosystem (E).

The ecosystem (E) is provided with computerized means of primary image processing and software (21), including a shape processing computer server (SF) of the ecosystem (E). These computerized means of primary image processing and software (21) are configured to perform automatic digital processing by shape recognition (TNFij) of the primary image files (FBij) of each product ($1ij$) to be graded, extracted from the inventory database (Bi) of each tannery (Fi). They ensure the identification in the primary image files (FBij) of the topological identifiers (ITij) of the type and/or position of the topological defects of the products ($1ij$) to be graded, with reference to the topological criteria of the norm (N0) of topological quality.

Computer means and software for storing secondary topological files (22) are configured to record the topological identifiers (ITij) in the form of a vector secondary image file (FSij) of each product ($1ij$) to be graded and memorize them into a topological database (BF) of a shape processing computer server (SF) of the computer network for digital linking (RL), with reference to the offered product identifier (Iij) and to the factory identifier (Ii).

Computerized grading means and software (23), located within a grading computer server (SG) of the ecosystem (E), are configured to dynamically perform, by a programmed digital grading process (TDGij), the determination of the topological quality grade (Gij) of the products ($1ij$) offered for sale on the platform (CL) by one of the factories (Fi), considering the norm (NO); this being done from the secondary image file (FSij), extracted from the topological database (BF). They also ensure the grades (G, Gij) be memorized into a grade database (BG) on the grading computer server (SG), with reference to the offered product ($1ij$) identifier and to the factory identifier (Ii).

The tannery device (DT) comprises stock management computer means and software (24), configured to dynamically implement the global recording process of grades (TGG), by which the evolving multitude of grades ($\Sigma$Gij) of all offered products ($\Sigma 1ij$) is memorized, with reference to the stock parameters ($\Sigma$PSi) of their factories (Fi) into the inventory database (BI) of the platform (CL).

Computerized means for filtering by grade (25) the available stock are configured to perform a complying selection process (TSCkr), to select a combined-subset (SCkr) of products ($1ij$) complying with the grade (Gr) requested by the purchase request (RAkr) of a buyer (Ak), formed by the combination of a multitude of complying fractions (FC1, . . . , FCi) of products ($1ij$) of grade (G) offered by the different factories (Fi), with reference to their product identifiers (Iij) and to the identifier (Fi) of the factories.

With combined reference to figures [FIG. 1] and [FIG. 2], the specific means of the method and of the optimization device according to the invention, to solve in its generic form the technological problem mentioned above, are described.

The tannery device (DT) implementing the method according to the invention is equipped with computerized means for requests processing and software (15) for requests from the trading platform (CL), configured to receive from a buyer (A, Ak), in addition to and among the set of request criteria (CR, CRkr) of its request (RA, RAkr), an optimization parameter (PO, POkr). Thanks to this optimization parameter (PO), the buyer (Ak) indicates his choice to the platform (CL):

a. of the numerical constraint parameter (PN, PNkr) of the requested optimization, and, b. of a said second optimization constant (CS2, CS2$kr$).

These two parameters are taken in a complementary and exclusive manner from either the complementary parameter (PC, PCkr) or the volume parameter (PV, PVkr).

The platform server (SP) of the platform (CL) has computerized means of batch optimization and software (26), configured to perform parametric optimization (OPC, OPCkr) under-constraint, by digital processing, of the selection of an optimized offered combined batch (LO, LOkr) according to the set of request criteria (CRkr), under constraint of the numerical constraint parameter to be optimized (PN). According to the method of the invention, this selection is performed by combining a plurality of complying sub-fractions (Si1, . . . , Sim), extracted from some of the complying fractions (FCi) of the combined-subset (SCkr), optimally distributed among some of the tanneries (F1, . . . , Fi).

The computerized means of batch optimization (26) are configured to perform their parametric optimization (OPC, OPCkr):
 a. by using the optimization variable (VO, VO(x)), constituted by the multitude of possible and variable n-tuples (N(x)), each consisting of an element collection N(x)=(Iijx1, . . . , Iijxn)) formed of variable product identifiers (Iij) extracted from the combined-subset (SCkr);
 b. by using two optimization constants, a first optimization constant (CS1) equal to the grade (G), and the other second constant (CS2) chosen according to the optimization parameter (PO);
 c. by maximizing or minimizing the numerical constraint parameter (PN) chosen according to the optimization parameter (PO), by varying the possible n-tuples (N(x)) of the optimization variable (VO), and by determining for each n-tuple the reached value of the numeric constraint parameter (PN); and,
 d. by setting by a dimensional conditional choice (CD, CDkr), the dimension of the variable n-tuples (Nx), depending on the optimization choice parameter (PO).

The computerized means for requests processing and software (15) of the platform (CL), are configured to make an offer (OF, OFkr) for an offered combined and optimized batch (LO, LOkr) to the buyer (A, Ak) resulting from the parametric optimization (OPC), via the Internet network (14), by further submitting thereto the reached numerical optimum (OP, OPkr), which is the solution to the optimized constraint numerical parameter, that is to say the minimum or the maximum reached by the constraint numerical parameter (PN) to be optimized.

During the dimensional conditional choice (CD, CDkr), of dimension n of the variable n-tuples (N(x))) of the optimization variable (VO), depending on the optimization parameter (PO), it is proceeded the following way:
 a. Either the size (SR, SRkr) of the requested batch (LR) is imposed by the optimization choice parameter (PO), then a dimension of all the n-tuples (N(x)) (number of elements of the n-tuples) is set constant and equal to this size (SR), and in this case the offered size (SO, SOkr) of the offered batch (LO) will be the requested size (SR, SRkr);
 b. Or the size (SR) of the requested batch (LR) is not imposed by the optimization choice parameter (PO), in particular in the case where compliance with the numerical parameter (PN) leads to an adaptation of the offered batch size (SO), then the dimension n of each n-tuple (N(x)) variable in any way, up to the number of products of the complying combined-subset (SCkr) is chosen, and in this case the size of the offered batch (SO, SOkr) will be a result of parametric optimization (OPC).

The optimization method according to the invention is able to implement any topological norm expressed in numerical and parametric form, so as to be implemented in the form of an algorithm by the computerised grading means and software (23). A variant, preferred for the invention, of the parametric digital definition of a norm (NO) for topological quality of hides and skins implemented on the platform (CL) of the tannery device (DT) is conceptually described hereinafter. The conceptual topological quality criteria (CT) of the norm (NO) recommended by the invention are as follows:
 a. Let (H) be a hide. Let (d)=d (T, $S^{min}$, $S^{max}$, $A^{min}$, $A^{max}$, Z, P, P') be a hide defect criterion having non-zero importance in its quality ranking, with the following necessary parameters to meet it:
  i. T is a type of defect (eg, scar, hole, scratch, etc.).
  ii. $S^{min}$ is the minimum of the defect largest dimension.
  iii. $S^{max}$ is the maximum of the defect largest dimension.
  iv. $A^{min}$ is the minimum surface area of the defect.
  v. $A^{max}$ is the maximum surface area of the defect.
  vi. Z is the zone on which the defect is positioned (eg, belly, back, rump, etc.).
  vii. P is the defect position within the zone on which it is positioned.
  viii. P' is the depth of the defect.
 b. Let (c)=c (H, d), be the number of defects on the hide (H) meeting the defect criterion (d).
 c. Let (g)=g ($t^{min}$, $t^{max}$, $d^{min}$, $c^{min}$, $d^{max}$, $c^{max}$, $a^{min}$, $d^{area}$), a global criterion for the topological quality of a hide (H), with the following necessary parameters to meet it:
  i. $t^{min}$ is the minimum total hide area (H).
  ii. $t^{max}$ is the maximum total hide area (H).
  iii. $c^{min}$ is the minimum number of defects of the hide (H) meeting the $d^{min}$ criterion.
  iv. $c^{max}$ is the maximum number of defects of the hide (H) meeting the $d^{max}$ criterion.
  v. $a^{min}$ is the minimum surface area containing no defect $d^{area}$.
 d. Let G (H, g) be the defect application value of the global topological quality criterion (g) on the hide (H); wherein G (H, g)=1 if the hide (H) meets (g); and wherein G (H, g)=0 if the hide (H) does not satisfy (g).
 e. Let (s)=s (H, D, W, G', W'), be the grade score function of a hide (H) according to the norm (NO), with the following parameters:
  i. D={$d^1$, . . . , $d^n$|n∈N} are the criteria defining the defects having a non zero importance in ranking a hide.
  ii. (W)={$w^1$, . . . , $w^n$} are weights or importance coefficients set by the norm (NO), corresponding to criteria D, where ($w^i$) is the importance criterion of a defect meeting a criterion default ($d^i$).
  iii. G'={$g^1$, . . . , gn'|n'∈N} are the global criteria having a non-zero importance in the ranking of a hide (H).
  iv. W'={$w'^1$, . . . , $w'^m$} are the importance coefficients corresponding to the global criteria (G').

According to a preferred implementation variant of the programmed digital grading process (TDGij), the score function(s) for the grade of a hide (H) is set as follows:

$$(s) = s(H, D, W, G', W') = \sum_{i=1}^{n} wi * G(H, di) + \sum_{i=1}^{n'} w'j * G(H, gj) \qquad [\text{Math 1}]$$

According to a preferred implementation variant of the method according to the invention, the grading scale (SCA) of the norm (NO) is set as follows:
  a. The grade (g) of a hide (H, 1$ij$) is given by the ranking function g:
     i. (g)=g (H, D, W, G', W', T')=1, if s (H, D, W, G', W')<$t^1$
     ii. (g)=g (H, D, W, G', W', T')=m, if s (H, D, W, G', W')<$t^m$.
     iii. (g)=g (H, D, W, G', W', T')=m+1, if the above conditions are not met.
  b. T'={$t^1$, . . . , $t^m$|m∈N} constitutes the grading scale (SCA) of the norm (NO), where $t^i$ is the score upper limit to obtain a grading (G) ranking equal to i.

By way of example, the invention recommends three hereinafter defined examples of the implementation of its preferred parametric norm (NO) and of the process for determining the grade (G) of a hide (H).

A first implementation example of the parametric norm (NO) for grading hides recommended by the invention relates to the case of "Holed Hides". To define the ranking function g, the defect criteria and their weight are set as follows: D={$d^1$}; where $d^1$=(hole, 2 mm, 0, 0, 0, 0, 0) et W={1}; G'=0; W'=0; et T'={1}. Criterion d1 defines a hole with a minimum length of 2 mm. The associated weight or importance coefficient is 1. Therefore, the value of the score function s increases by 1 for each type $d^1$ defect present on H. The unique score threshold is 1. Therefore, any hide without a hole $d^1$ obtains a ranking of 1; and any hide containing a $d^1$ (or greater) hole gets a ranking of 2.

A second implementation example of the parametric norm (NO) for grading hides recommended by the invention relates to the case of "Hides with open defects". Hides (H) that contain at most one open defect (i.e. over 5 mm in depth) obtain grade (G=1). Hides (H) that contain 2 to 5 open defects get grade (G=2). Hides (H) that contain 6 or more open defects get grade (G=3). To define the ranking function G, the defect criteria and their weight are set as follows: D={$d^1$} where $d^1$=(0, 0, 0, 0, 0, 0, located more than 5 cm from the edges of the hide, more than 5 mm); W={1}; G'=0; W'=0; et T'={2, 6}.

The third implementation example of the parametric norm (NO) for grading hides (H) recommended by the invention relates to the preferred implementation form of the norm (NO). It allows the algorithmic implementation, by the programmed digital grading process (TDGij) of the computerised grading means and software (23), of the "Standards Governing the Sale of North American Cattle Hides" adopted by the "United States Hide, Skin & Leather Association" in August 2014. This ranking standard includes 4 grades, from grade 1 (best quality) to grade 4 (non-tannable). To define and implement by a computer process the ranking function G according to the invention, the defect criteria and their weight are set as follows:
  a. D=D={$d^1$, . . . , $d^{14}$}.
  b. $d^1$=(hole, 0, 6 in, 0, 0, 0, located more than 4 in from the edges of the hide, 0).
  c. $d^2$=(cut, 0, 6 in, 0, 0, located on the zone above the hock line, 0, 0).
  d. $d^3$=(cut, 1 in, 6 in, 0, 0, located on the zone below the hock line, 0, 0).
  e. $d^4$=(deep cut, 0, 0, 0, 0, 0, 0, 0).
  f. $d^5$=(gouge, 0, 0, 0, 0, 0, 0, 0).
  g. $g^1$=(0, 0, 0, 0, 0, 0, half of the hide surface area, ($d^1$, $d^2$, $d^3$, $d^4$, $d^5$)).
  h. $d^6$=(hole, 0, 6 in, 0, 0, 0, 0, 0).
  i. $d^7$=(cut, 0, 6 in, 0, 0, $Z^1$, 0, 0).
  j. $d^8$=(deep cut, 0, 0, 0, 0, $Z^1$, 0, 0).
  k. $d^9$=(gouge, 0, 0, 0, 0, $Z^1$, 0, 0).
  l. $g^2$=(0, 0, ($d^6$, $d^7$, $d^8$, $d^9$), 1, ($d^6$, $d^7$, $d^8$, $d^9$), 4, 0, 0).
  m. $d^{10}$=(grain default, 0, 0, 1 ft$^2$, 0, 0, 0, 0)
  n. $d^{11}$=(wart, 0, 0, 1 ft$^2$, 0, 0, 0, 0).
  o. $d^{12}$=(unhealed scab, 0, 0, 1 ft$^2$, 0, 0, 0, 0).
  p. $d^{13}$=(hole, 6 in, 0, 0, 0, 0, 0, 0).
  q. $d^{14}$=(cut, 6 in, 0, 0, 0, 0, 0, 0).
  r. $g^3$=(0, 0, ($d^6$, $d^7$, $d^8$, $d^9$), 5, 0, 0, 0, 0).
  s. W={0, 0, 0, 0, 0, 0, 0, 0, 0, 5, 50, 50, 50, 50}.
  t. G'={$g^1$, $g^2$, $g^3$}.
  u. W'={1, 5, 50}.
  v. T'={1, 10, 100}.

Figure 7:
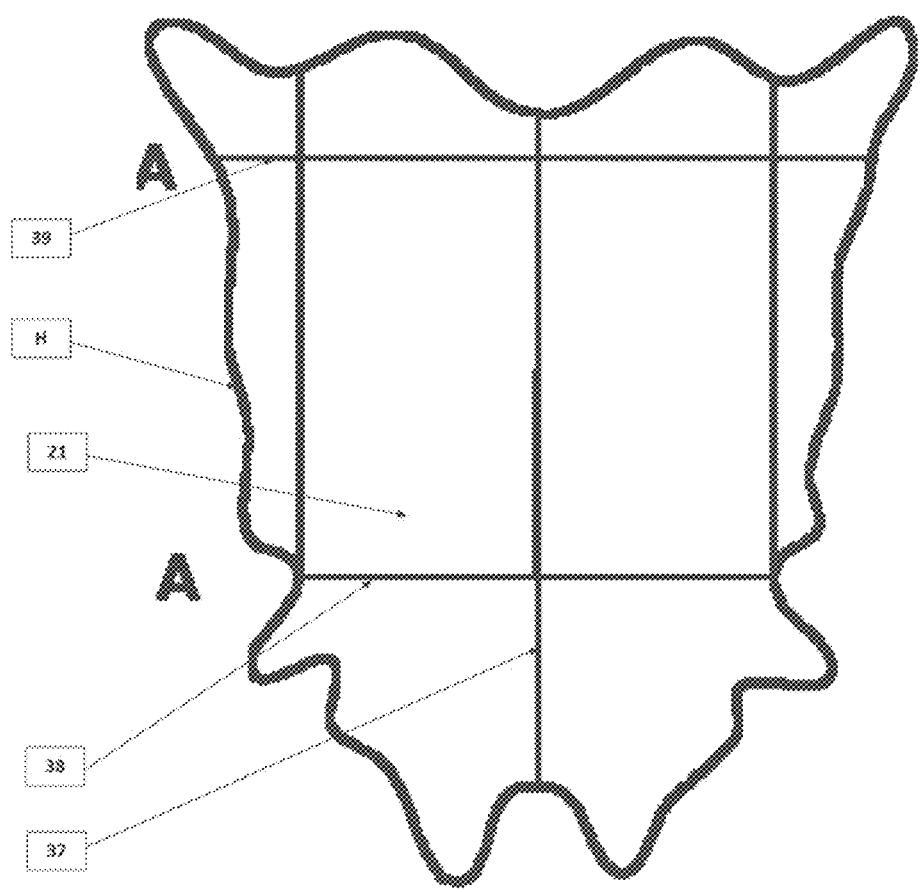
FIG. 7 is a view of hide during grading indicating a specific zone of interest.

With reference to figure [FIG. 7], a hide (H) on which the zone of interest ($Z^1$) is shown. This zone ($Z^1$) is located on either side of the spine (37). It is located between the lower armpits (38) and the upper armpits (39). According to the global criterion $g^1$ for a grade 1 hide (H), the zone ($Z^1$) must not bear any type $d^1$, $d^2$, $d^3$, $d^4$, $d^5$ defect. According to criterion $g^2$ for a grade 2 hide, zone ($Z^1$) may contain between 1 and 4 type $d^6$, $d^7$, $d^8$, $d^9$ or $d^{10}$, $d^{11}$, $d^{12}$, $d^{13}$, $d^{14}$ defects. According to criterion $g^3$ for a grade 3 hide (H), the zone ($Z^1$) can contain up to 5 type $d^6$, $d^7$, $d^8$, $d^9$ defects. Otherwise the hide (H) is given a grade 4 (not tannable).

The process according to the invention applies in a homogeneous manner in the multitude of pooled tanneries (Fi), to a wide range of request criteria (CRkr) from buyers (Ak), including a great variability of the homogeneous requested grade parameter (G, Gkr), of the complementary parameter (PC, PCkr), of the volume parameter (PV, PVkr), and of the optimization parameter (PO, POkr).

According to an adaptation variant of the optimization method according to the invention to a first type of request criteria (CRkr), purchase requests (RA) originating from of a multitude of buyers (A) are received and processed, for the supply of requested batches (LR) of products (1), further imposing, by their set of request criteria (CR), a transformation step parameter (PS, PSkr) of the products (1$ij$) to be supplied in the offered batch (LO). A combined-subset (SCkr) of products (1$ij$) complying both with the requested grade (Gkr) and with the requested transformation step parameter (PSkr) is extracted by the complying selection process (TSCkr). An under-constraint parametric optimization (OPCkr) of the selection of an optimal offered batch (LOkr) extracted from the combined-subset (SCkr) is carried out.

According to an adaptation variant of the optimization method according to the invention to a second type of request criteria (CRkr), in his/her purchase request (RA), the buyer (A) sets the complementary parameter (PC) of batch geometric selection (LO), as an alphanumeric parameter linked to the general shape of products (1$ij$). The complementary parameter (PC) chosen may refer in particular to a quantifiable geometric particularity linked to the surface area of the product (1), such as a maximum surface area, a minimum surface area, a maximum weight, the shape compliance of its periphery to a shape standard, etc. The buyer (A) sets the optimization parameter (PO), by which he indicates the numerical constraint parameter to be optimized (PN), as being this complementary geometric selection criterion (PC). In this case, an under-constraint parametric optimization (OPC) is carried out, by digital processing, of the selection of the optimized combined offered batch (LO), under the constraint of maximizing or minimizing the geometric selection complementary criterion (PC).

According to an adaptation variant of the method according to the invention to a third type of request criteria (CRkr), the optimization of the constitution of product (1$ij$) batches is carried out, under the constraint of minimizing the number of products (1ij), allowing positioning a minimum number of cut outs (VP) for pieces (J) to be produced from the requested batch (LR). In his purchase request (RA), the buyer (A) sets the complementary criterion (PC) for selecting the requested batch (LR) positioning, as consisting of the number (SR, SRkr) of products (Iij) of the requested batch (LR), respecting a positioning and cutting capacity (CP, CPkr) of pieces (J) to be cut out in the products (1ij) of the requested batch (LR), further imposing that, within the offered batch (LO), a specified minimum number of cut outs (VP, VPkr) of pieces (J) can be made, according to the size and geometry of predefined pieces (J). The pieces (J) must possibly be positioned in one or more predefined zones of interest (Z, $Z^1$) of the product, and/or include a maximum number of defects of the types indicated. The buyer (A) sets the volume parameter (PV) equal to the requested batch size (SR, SRkr). The buyer (A) sets the optimization choice parameter (PO) (by which he chooses the numerical constraint parameter to be optimized (PN)), as being equal to the volume parameter (PV) which is itself equal to the size of the requested batch (SR, SRkr). The buyer (A) therefore sets the positioning selection complementary criterion (PC) as being the second optimization constant (CS2), in addition to the first constant (CS1) for grade (G). In this case, an under-constraint parametric optimization (OPC) is carried out, by digital processing, of the selection of the optimized combined offered batch (LO), by minimizing the volume parameter (PN=PV) and therefore the size of the offered batch (SO), respecting the complementary criterion (PC) imposed constraint of positioning and cutting capacity (CP, CPkr).

According to an adaptation variant of the optimization method of the invention to a fourth type of request criteria (CRkr), the optimization of the constitution of product (1ij) batches is carried out under constraint of minimizing the number of supplying factories. In his/her purchase request (RA), the buyer (A) sets the complementary criterion (PC) for selecting the requested batch (LR), as consisting of the number of supplying factories (VF, VFkr) supplying the products (1ij) of the offered batch (LO). The buyer (A) sets the volume parameter (PV) equal to the requested batch size (SR). The buyer (A) sets the optimization choice parameter (PO) (by which he chooses the numerical constraint parameter to be optimized (PN)), as being equal to the complementary parameter (PC) which is itself equal to the number of supplying factories (VF). The buyer (A) therefore sets the volume parameter (PV) and therefore the requested batch size (SR) as being the second optimization constant (CS2), in addition to the first constant (CS1) for grade (G). In this case, an under-constraint parametric optimization (OPC) is carried out, by digital processing, of the selection of the optimized combined offered batch (LO), by minimizing the complementary parameter (PN=PC=VF), and therefore by minimizing the number of supplying factories (VF), respecting the volume parameter (PN=PV) constraint and therefore the size of the requested batch (SR).

According to an adaptation variant of the optimization method of the invention to a fifth type of request criteria (CRkr), the optimization of the constitution of product (1ij) batches is carried out under additional constraint of minimizing the transport cost. In his/her purchase request (RA), the buyer (A) sets the complementary criterion (PC) for selecting the requested batch (LR), as constituted by the sum of the distances (VD, VDkr) (and/or the components of transport cost) between a delivery place (LL, LLkr) chosen by the buyer (A) and the address of the various factories (Fi) supplying the products (1ij) of the offered batch (LO). The buyer (A) sets the volume parameter (PV) equal to the requested batch size (SR). The buyer (A) sets the optimization choice parameter (PO) (by which he chooses the numerical constraint parameter to be optimized (PN)), as being equal to the complementary parameter (PC) which is itself equal to the sum of transport distances (VD). The buyer (A) therefore sets the volume parameter (PV) and therefore the requested batch size (SR) as being the second optimization constant (CS2), in addition to the first constant (CS1) for grade (G). In this case, an under-constraint parametric optimization (OPC) is carried out, by digital processing, of the selection of the optimized combined offered batch (LO), by minimizing the complementary parameter (PN=PC=VD), i.e. the sum of the transport distances (VD) of the batch (LO), respecting the volume parameter (PV=SR) constraint of the size of the offered batch (LO).

According to an adaptation variant of the optimization method of the invention to a sixth type of request criteria (CRkr), the optimization of the constitution of product (1ij) batches is carried out under additional constraint of maximizing preferred supplying factories. The buyer is offered the possibility of indicating in alpha numeric form, in his purchase (RA) request of a requested batch (LR), a list of preference (LP, LPkr) regarding supplying factories (Fi). In his purchase request (RA), the buyer (A) sets the complementary criterion (PC) for selecting the requested batch (LR), as constituted by the proportion of origin (OR, ORkr) of the products (1ij) of the offered batch (LO) originating from supplying factories (Fi) included in the preferred list (LP). The buyer (A) sets the volume parameter (PV) equal to the requested batch size (SR). The buyer (A) sets the optimization choice parameter (PO) (by which he chooses the numerical constraint parameter to be optimized (PN)), as being equal to the complementary parameter (PC) which is itself equal to the origin proportion (OR). The buyer (A) therefore sets the volume parameter (PV) equal to the requested batch size (SR) as being the second optimization constant (CS2), in addition to the first constant (CS1) for grade (G). In this case, an under-constraint parametric optimization (OPC) is carried out, by digital processing, of the selection of the optimized combined offered batch (LO), by maximizing the complementary parameter (PN=PC), i.e. the proportion of origin (OR) of products (1ij) of the offered batch (LO) originating from supplying factories (Fi) included in the preferred list (LP).

According to an adaptation variant of the optimization method of the invention to a seventh type of request criteria (CRkr), the optimization of the constitution of product (1ij) batches is carried out under additional constraint of complying with the product surface area. In his purchase request (RA), the buyer (A) sets the complementary criterion (PC) for selecting the requested batch (LR), as constituted by the variance of the surface area of the products (SFV, SFVkr) with respect to a mean surface area (SFM, SFMkr) requested of the products (1ij) of the requested batch (LR). The buyer (A) sets the volume parameter (PV) equal to the requested batch size (SR). The buyer (A) sets the optimization choice parameter (PO) (by which he chooses the numerical constraint parameter to be optimized (PN)), as being equal to the complementary parameter (PC) which is itself equal to the variance of the surface area of the products (SFV, SFVkr). The buyer (A) therefore sets the volume parameter (PV) equal to the requested batch size (SR) as being the second optimization constant (CS2), in addition to the first constant (CS1) for grade (G). In this case, an under-constraint parametric optimization (OPC) is carried out, by digital processing, of the selection of the optimized combined offered batch (LO), by minimizing the complementary parameter (PN=PC) of surface area variance of the products (SFV, SFVkr) with respect to the requested average surface area (SFM, SFMkr) of the products (1ij) of the offered batch (LO).

According to an adaptation variant of the optimization method of the invention to an eighth type of request criteria (CRkr), the optimization of the constitution of product (1ij) batches is carried out under additional constraint of a product thickness. In his purchase request (RA), the buyer (A) sets the complementary criterion (PC) for selecting the requested batch (LR), as constituted by the variance of the thickness of the products (EPV, EPVkr) with respect to a mean thickness (EPM, EPMkr) requested of the products (1ij) of the requested batch (LR). The buyer (A) sets the volume parameter (PV) equal to the requested batch size (SR). The buyer (A) sets the optimization choice parameter (PO) (by which he chooses the numerical constraint parameter to be optimized (PN)), as being equal to the complementary parameter (PC) which is itself equal to the variance of the thickness of the products (EPV, EPVkr). The buyer (A) therefore sets the volume parameter (PV) equal to the requested batch size (SR) as being the second optimization constant (CS2), in addition to the first constant (CS1) for grade (G). In this case, an under-constraint parametric optimization (OPC) is carried out, by digital processing, of the selection of the optimized combined offered batch (LO), by minimizing the complementary parameter (PN=PC) of thickness variance of the products (EPV, EPVkr) with respect to the requested average thickness (EPM, EPMkr) of the products (1ij) of the offered batch (LO).

In the general form of the method according to the invention represented in figure [FIG. 1]:

a. At the level of the factory computer server (Si) of each factory (Fi) which offers graded products (1ij) via the platform (CL): i) automatic digital optical acquisition (TODij) is carried out dynamically in the factory (Fi) by scanning a raw primary image file (FBij) of each of the products (1ij) to be graded, and, ii) the primary image files (FBij) are recorded into a memory of the factory inventory database (Bi); with reference to the stock parameters (Psi).

b. At any location in the computer network for digital linking (RL) of the ecosystem (E), within a shape processing computer server (SF) of the network (RL) of the ecosystem (E): i) automatic digital processing by shape recognition (TNFij) of the primary image files (FBij) of each product (1ij) to be graded, extracted from each factory inventory database (Bi), and identifying in the primary image file (FBij) the topological identifiers (ITij) of the type and/or of the position of the topological defects of the products (1ij) to be graded are performed, with reference to the topological criteria of the topological quality norm (N0); and ii) these topological identifiers (ITij) are recorded in the form of a vector secondary image file (FSij) of each product (1ij) to be graded, which is memorized into a topological database (BF) of a shape processing computer server (SF) of the computer network for digital linking (RL), with reference to the offered product identifier (Iij) and to the factory identifier (Ii).

c. At any location in the computer network for digital linking (RL) of the ecosystem (E): i) a programmed digital grading process (TDGij) is dynamically implemented, by which the topological quality grade (Gij) of the products (1ij) offered for sale on the platform (CL) by the factories (Fi) is determined, within one of the grading computer servers (SG) of the ecosystem (E), with regard to the norm (N0), from the secondary image file (FSij), extracted from the topological database (BF); and ii) the topological quality grades (Gij) of all products (1ij) are memorized into a grade database (BG) on the grading computer server (SG), with reference to the offered product identifier (Iij) and to the factory identifier (Ii).

d. At any location on the Computer Network (RL) for digital linking, of the ecosystem (E), the global stock management process (TGG) is dynamically implemented, by which the evolving multitude of grades (ΣGij) of all the products (Σ1ij) offered is memorized, with reference to the stock parameters (ΣPSi) of their factories (Fi), into an inventory database (BI) of the platform (CL).

Figure 3:
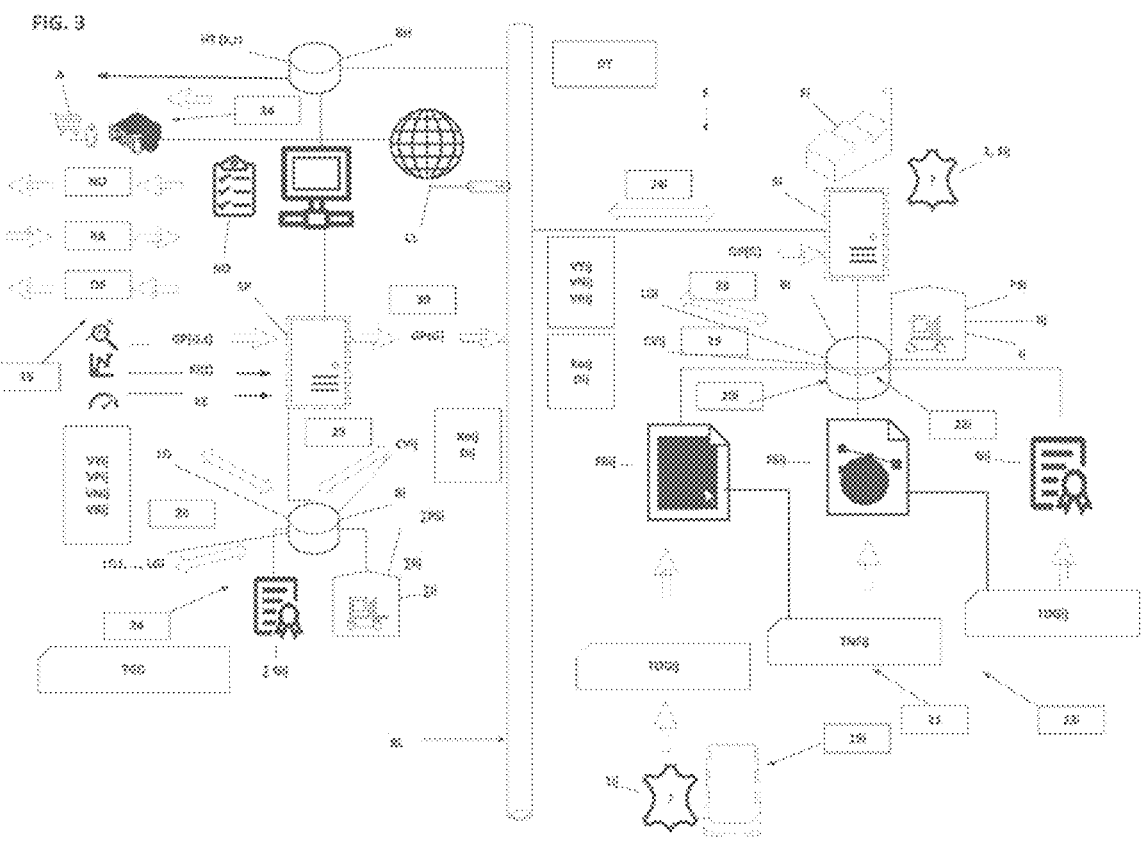
FIG. 3 is an implementation diagram of the method and device according to the invention, with grading being operated at the factory level.

With reference to figure [FIG. 3], a first preferred variant of the grading process implementation at the tannery (Fi) level. It can be seen that within the industrial tannery device (DT), at least some tanneries (Fi) of the device (DT) have grading computer means and software in the factory (23i). These are of the type configured to carry out, at the factory computer server (Si) level, the digital processing by shape recognition (TNFij) of the primary image files (FBij) of each product (1ij) to be graded, extracted from the factory inventory database (Bi). They ensure the dynamic generation of vector secondary image files (FSij) of the products (1ij). They implement at factory level (Fi) a programmed digital grading process (TDGij), for the dynamic determination of the grade (Gij) for each new product (1ij) offered by the tannery (Fi). They memorize (22i) into the inventory database (Bi) of the tannery (Fi), the secondary image files (FSij), and the quality grade (Gij), with reference to the offered product (1ij) identifier and to the factory identifier (Ii). They perform the dynamic and periodic transfer (24i) in digital form, through the computer network for digital linking (RL), of the grades (Gij) of the graded products offered for sale by the tannery (Fi), of the inventory database (Bi) from the tannery to the stock management computer resources and software (24) of the platform (CL). They dynamically record the evolving multitude of all grades (ΣGij) for all products (Σ1ij) offered by the tannery (Fi) into the inventory database (BI) of the platform (CL).

Figure 4:
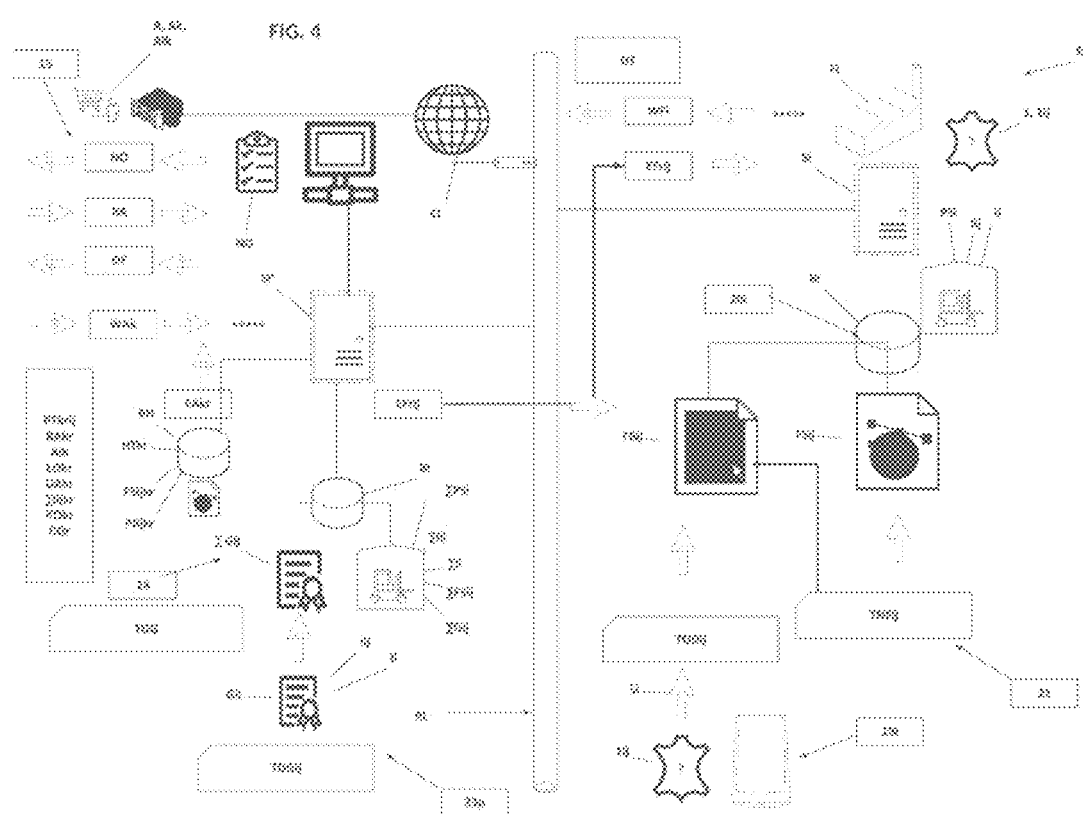
FIG. 4 is an implementation diagram of the method and device according to the invention, with grading being operated at the online commerce platform level.

With reference to figure [FIG. 4], a second preferred variant of the grading process implementation at the platform (CL) level. As was the case previously with reference to the figure [FIG. 3], each tannery (Fi) carries out, at the level of its factory computer server (Si), the digital processing by shape recognition (TNFij) of the primary image files (FBij) for each product (1ij) to be graded, extracted from the factory inventory database (Bi); and ensures dynamic generation of the vector secondary image files (FSij) of the products (1ij). But it can also be seen that within the tannery device (DT), the platform (CL) has grading computer means and software (23p). These are of the type configured to carry out a programmed digital grading process (TDGij), in order to dynamically determine the grade (Gij) for each product (1ij) offered by each factory (Fi). They proceed to memorizing into the inventory database (BI) of the platform (CL) all the secondary image files (ΣFSi), and all the quality grades (ΣGij) of all products (Σ1ij) offered by each tannery (Fi), with reference to all their factory identifiers (ΣIi) and product identifiers (ΣIij).

With reference to figures [FIG. 1] and [FIG. 6], an implementation variant of the method according to the invention can be seen, with dynamic updating of the tannery stocks. The stock management operator screen (27) of a tannery (Fi) in interaction with the ecosystem of the tannery device (DT) can be seen on figure [FIG. 6]. Through the screen (27), an operator of the tannery (Fi) periodically and dynamically visualizes and/or records into the factory inventory database (Bi), the factory stock list (LGi) including the reference (Ii) of the products (1ij) having received a topological quality grade (Gij), and the sold and/or newly graded products. Each tannery (Fi) periodically and dynamically defines and updates into its factory stock list (LGi), the sub-lists of the graded products that the factory (Fi), either wishes to put on sale (VYij) on the platform (CL), or does not wish to put up for sale (VNij), or else wishes to withdraw from sale (VRij) immediately or in the future. It can thus be seen that the products (1ij) of the tannery for sale on the platform (CL) appear shaded out on the screen (27). Products in stock not for sale on the platform (CL) appear in a non-shaded manner. And the products sold are crossed out.

In a complementary manner, according to a variant of the invention described in figure [FIG. 3], an interactive synchronization of the offers and sales of the platform (CL) and the tanneries (Fi) of the tannery device (DT) is carried out. According to this variant, a periodic interaction (28) is carried out, in a dynamic manner, and through the computer network for digital linking (RL) of the ecosystem (E), the inventory database of the platform (BI) is synchronized with the inventory databases (Bi) of each tannery (Fi), in order to make their information homogeneous. The stock list of the platform (LG), including all the products (Σ1ij) available (VYij) listed for sale for sale onto the platform (CL), in interactivity with the factory stock lists (LG1, . . . , LGi), is dynamically and periodically kept up-to-date in the inventory database of the platform (BI), with reference to the product identifiers (ΣIij) and to the factory identifiers (ΣIi) of the tanneries (Fi). The sales list (VPij) of products (1ij, Iij) made up for offered batches (LO) purchased by buyers (A) on the platform (CL), the list of new products (VYij) listed for sale by the tanneries (Fi) onto the platform (CL), and the list of products (VRij) possibly withdrawn from sale on the platform (CL) by the tanneries (Fi) are also kept up-to-date.

With reference to figures [FIG. 3] and [FIG. 6], an implementation variant of the method according to the invention can be seen, with a determination of the sale conditions by the tanneries (Fi). It can be seen in figure [FIG. 6] that through the screen (27), an operator of each tannery (Fi) has the possibility to indicate, through the computer network for digital linking (RL) of the ecosystem (E), and to interactively set on the platform (CL), the factory sale (CVij) conditions of the offered graded products (1ij, Iij). These include, for the tannery (Fi), the offered sale price (KOij) of the products (1ij), and, a sale duration (Dij) on the platform (CL), defining a final date before which the tannery (Fi) commits to selling through the platform (CL) and to delivering the product (1ij) to a buyer (A) of the platform (CL). With reference to figure [FIG. 3], it can be seen that the tannery (Fi) periodically dynamically transmits (29), its factory sale conditions (CVij) to the platform (CL). At the level of the platform computer server (SP), the conditions for factory listing sale (CVij) are dynamically recorded and updated into the platform inventory database (BI), with reference to the product identifier (Iij) and the factory identifier (Ii).

With reference to figure [FIG. 3], an implementation variant of the method according to the invention can be seen, with a determination of an indicative price of the products by the trading platform (CL). At the platform (CL) level, a range of suggested indicative prices (GP (G, t)), of the different grades (G) of the product (1), evolving over time (t), is dynamically and periodically suggested. The server (SP) of the platform (CL) communicates (30) the suggested indicative prices (GP (G, t)) range to each tannery (Fi) through the computer network for digital linking (RL).

With reference to figure [FIG. 3], a first variant for determining the indicative price by the platform (CL) with reference to a dynamic indicator can be seen. The server (SP) of the platform (CL) sets a dynamic reference price indicator (KI(t)) of the global market price in the industry (I) for the product (1), variable over time (t) depending on market conditions; as well as a numerical valuation scale (KE) of the different grades (G) for the products (1ij), in relation to the dynamic reference price indicator (KI(t)). The server (SP) of the platform (CL) dynamically and periodically calculates and records over time, the range of suggested indicative prices (GP (G, t)) updated with the price of products (1) of grade (G), in a manner correlated to the numerical valuation scale (KE) and to the temporal variations of the dynamic reference price indicator (KI(t)).

With reference to figure [FIG. 3], a second variant for determining the indicative price by the platform by historical reference can be seen. The platform computer server (SP) calculates the suggested indicative prices (GP(G,t)) range, updated over time (t), in a manner correlated with the price history (KHij(G,t)) of sales (KOij) from product transactions (1ij) of the various tanneries (Fi) completed on the platform (CL) and of their grade (G), as recorded in the transaction history database (BH) of the platform (CL).

According to a preferred arrangement of the invention, at the level of the platform computer server (SP), the evolution in the range of suggested indicative prices (GP(G,t)) is provided to tanneries (Fi) and/or to buyers (A), through the through the digital link computer network (RL).

Figure 5:
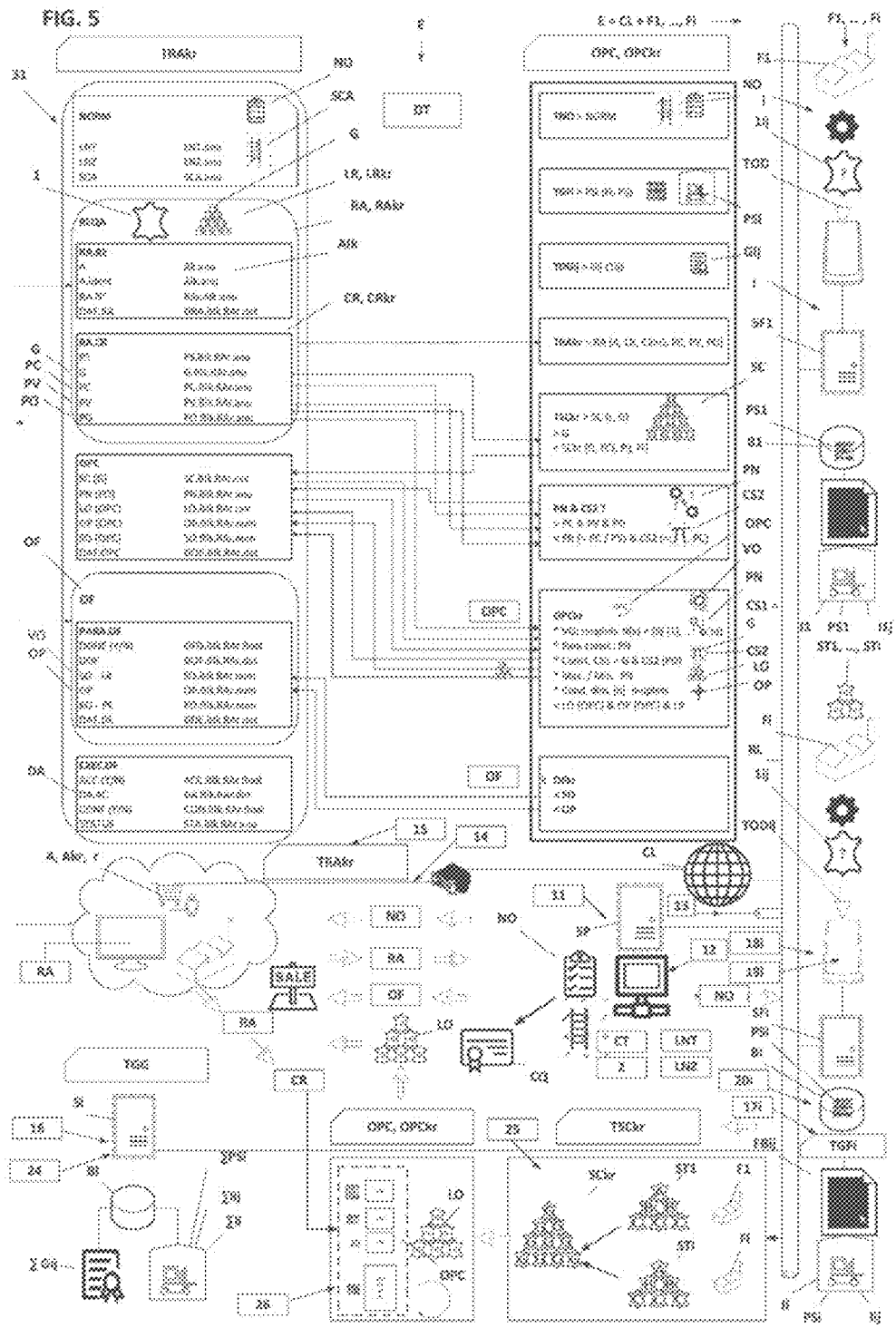
FIG. 5 is a simplified diagram of the steps of the optimization process according to the invention and of the file and data exchanges between the trading platform, the factories and the buyers.

With reference to figure [FIG. 5], a simplified diagram of the optimization process steps according to the invention and the file and data exchanges between the trading platform (CL), the tanneries (Fi) and the buyers (Ak) of the tannery device (DT) can be seen. In the left part of figure [FIG. 5], the various parameters of a purchase request (CR, CRkr), and the processing steps (TRAkr) by the platform (CL), as well as the references of the alphanumeric files associated with the parameters (G, PC, PV, PO) can be seen on an operator screen for managing purchase requests (31), connected to the server (SP) of the platform (CL). In the central part of figure [FIG. 5], the different steps of the optimization method according to the invention can be seen; and in particular the choice (TNO) of the norm (NO), the various optimization processes (TGFi, TDGij, TRAkr, TSCkr, OPCkr), as well as the associated file exchanges shown by means of arrows. Each of these processes has been described with reference to figures [FIG. 1] to [FIG. 4]. The process results in the offer (OF, OFkr) made to the buyer (A, Akr), which includes the offered batch (LO, LOkr), the size (SO, SOkr) thereof, and its reached optimum (OP, OPkr).

With reference to figure [FIG. 5], it can be seen that the trading platform (CL) of the tannery device (DT), provides a buyer (Ak) with a quality certificate (CQ) for an offered batch (LO, LOkr). Preferably it includes the certification of the quality grade (G) for the offered batch (LO) according to the norm (NO), and/or an indication of the manufacture date of the products (1ij) of the batch by the various tanneries (Fi), and/or an indication of the origin of the products (1ij), such as the location and/or identification of the factories (Fi) supplying the sub-fractions (Si1, . . . , Sim) of the products (1ij) of the offered batch (LO).

A preferred variant for communicating documents from the platform (CL) to a buyer (Ak) is described with reference to figure [FIG. 4]. According to this variant, the server (SP) of the platform (CL) records the transaction history (HTkr) carried out on the trading platform (CL) with each buyer (Ak) for each offered batch (LOkr) corresponding to a purchase request (RAkr), into a secured transaction history database (BH) connected to the network (RL) of the ecosystem (E). This transaction history (HTkr) includes the following transaction parameters (PTkrij): the buyer identifier (Alk), the transaction reference of the offered batch (LOkr), and in particular the request reference (RAkr), the transaction date (DAkr), the composition of the products (ΣIijkr) of the offered batch (LOkr), the origin identifier of the tanneries (Ii) supplying each product (1ij) of the batch, and possibly the selling price (KOkr) and a quality certificate (CQkr) of the purchased offered batch (LOkr).

With reference to figure [FIG. 4], it can be seen that the platform (CL) preferably sets, together with the buyer (Ak), a buyer password (WAk) previously recorded by the platform (CL), thanks to its buyer identifier (Alk). The platform (CL) allows a buyer (Ak) to consult and/or download in a secure and selective manner, thanks to his buyer identifier (Alk) and his buyer password (WAk), and via the internet network (14) connected to the platform (CL), buyer extracts (EAkr) from the transaction history (HTkr) recorded in the history database of his transactions (BH), for offered batch (LOkr) purchase transactions by the buyer (Ak). The platform (CL) filters out access of the buyer (Ak) to the transaction history database (BH), by means of his buyer identifier (Alk) and by his buyer password (WAk).

With reference to figure [FIG. 4], it can be seen that the platform (CL) preferentially sets, with each tannery (Fi) in the ecosystem (E), a factory password (WFi) previously recorded by the platform (CL), thanks to the factory identifier (Ii). The platform (CL) allows each tannery (Fi) to consult and/or download in a secure and selective manner, thanks to its factory identifier (Ii) and its factory password (WFi), and via the computer network for digital linking (RL) of the platform (CL), factory extracts (EFrij) of the transaction history (HTkr) recorded in the transaction history database (BH), for purchase transactions of offered batches (LOkr), consisting of products (ΣIijkr) originating from the tannery with the factory identifier (Ii). The platform (CL) selectively filters out access of each tannery (Fi) to the transaction history database (BH) for the products (1ij) supplied by the tannery (Fi), by means of its factory identifier (Ii) and by its buyer password (WFi).

Preferably, the platform (CL) allows a buyer (Ak) of an offered batch (LOkr), made up of products (Σ1ijkr), to electronically consult and/or to download, in a secure and selective manner via the Internet network (14) and through the computer network (RL) of the trading platform (CL), the primary image files FBijkr and/or the secondary image files FSijkr of one of the products (Σ1ijkr) of the offered batch (LOkr) that he bought. In addition, the platform (CL) preferably provides the buyer (Ak), and/or allows him/her to download, the secondary image files (FSijkr) of the products (1ijkr) of the offered batch (LOkr) he/she purchased, including a digital positioning and cutting plan (PJijkr) of pieces (J), optimized according to a complementary positioning parameter (PPkr) set by the buyer and specified in his request (RAkr).

Figure 8:
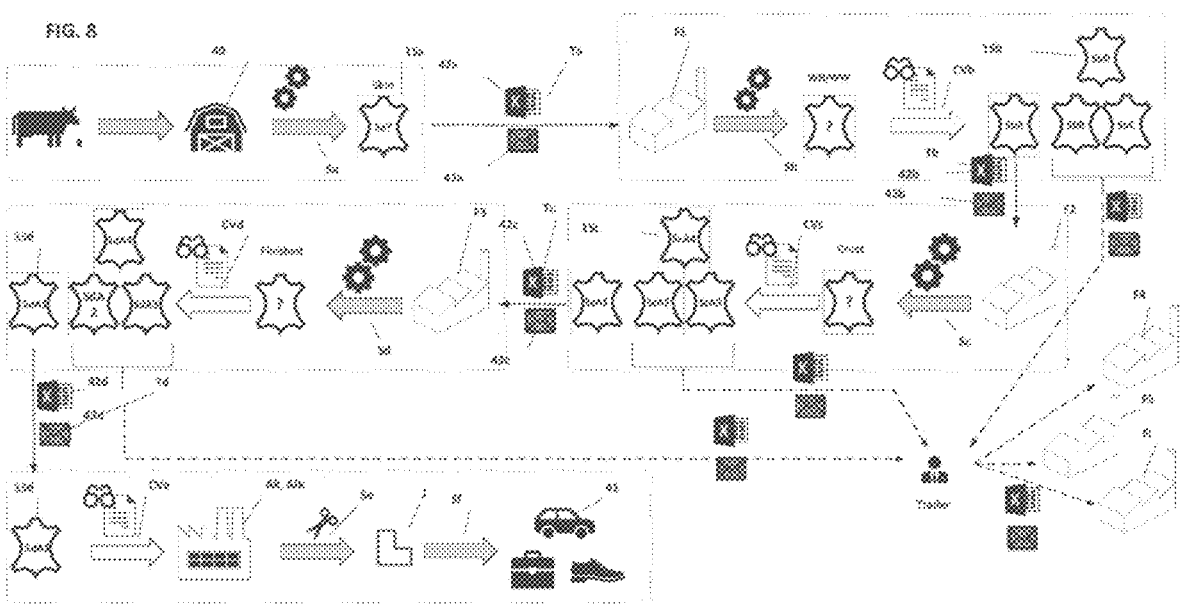
FIG. 8 is a diagram of the different stages of the tanning process and the different hide transactions according to the prior art.

With reference to figure [FIG. 8], the different conventional stages of the tanning process (Sa, Sb, Sc, Sd) and the different transaction stages (Ta, Tb, Tc, Td) for hides can be seen. The average duration of all these processings lasts about four weeks.

The first step (Sa) "Skin" occurs when exiting the slaughterhouse (40). The hides (1Sa) are then extremely fragile. They consist in 75% water in weight and degrade within a few hours. In order to stop the development of microbes and bacteria that cause this degradation, they are dehydrated by salting, drying or freezing. The hide (1Sa) is then in the so-called ("Hide") state.

The second stage (Sb) known as "beamhouse operations" and "first tanning" occur at the level of a multitude of tanneries (F1). During the "beamhouse operations", the hides (1Sb) are desalinated. Then they successively undergo soaking to remove dirt and impurities; liming consisting of the chemical removal of hair; washing; fleshing that removes the roots of remaining hairs; bating to make them supple and soft; acidification to remove remaining water; and finally cropping to eliminate the edges. The hides (1Sb) then undergo a first tanning process to transform them into durable and supple leather thanks to tannins. The tannins used are either plant or organic tannins, for so-called "White White" (WW) leathers; or mineral tannins such as chromium salts, for so-called "White Blue" (WB) leathers; due to color differences. The following is then carried out: dewatering; thickness adjustment; and drying. The hide (1Sb) is then in the so-called ("WB/WW") state.

The third step (Sc) called "second tanning" consists in dyeing the hides (1Sc); greasing the leather obtained; extracting the residual water; vacuum drying; and grain smoothing. The hide (1Sc) is then in the so-called ("Crust") state.

The fourth step (Sd) called "finishing" of the skin consists of embossing the hides (1Sd) by engraving them between cylinders; ironing; spinning; pressing; currying work; shaving to provide the final thickness; and a "air exposure" in a drum to soften them. The hide (1Sd) is then in the so-called ("Finished") state.

The hides (1Sa, 1Sb, Sc, 1Sd) have at the end of the different tanning stages (Sa, Sb, Sc, Sd) random topological defects, relating to their respective background, randomly distributed over the hide (1):
a. natural defects due to parasites on the living animal, such as carbuncles, scars, ringworms, tumors, ticks, lice, warble flies, etc.;
b. defects having a mechanical origin on the living animal, such as fire marks, bruises, scrapes, wounds, scratches due to barbed wire, etc.;
c. behavioral defects, such as dirt, droppings, urine stains, sand, seeds, etc.;
d. draft defects, such as cuts, spangles, holes, gouge marks, etc.;
e. defects due to preservation and storage, such as putrefaction, spalting, red spots, salt bites, etc.

Each of the tanning stages (Sa, Sb, Sc, Sd) requires different industrial equipment. As a result, different types of tanneries (F1, F2, F3, . . . , Fi) acquire and/or proceed as buyers (Ak) in transactions (Ta, Tb, Tc) with respect to other selling tanneries (Fi) for hides (1Sa, 1Sb, 1Sc) at the end of the first three tanning stages (Sa, Sb, Sc). In the final stage (Td), the finished skins (1Sd) are ultimately purchased and used by industrial integrators (Ak, Alk) in the clothing, footwear, automotive or furniture, . . . industries. The industrial integrator (Alk) then proceeds to a cutting step (Se) the finished skins (1Sd) into pieces (J), then to a step of assembling (Sf) of the different pieces (J) of leather for the manufacture of finished industrial products (41) such as car seats, shoes, leather goods, etc.

At the end of the three transformation tanning stages in the tanneries (Sb, Sc, Sd) as well as prior to the cutting stage (Se) by the industrial integrator (Alk), four checks (CVb, CVc, CVd, CVe), generally visual, of the topological quality of hides (1Sa, 1Sb, 1Sc) take place for the same hide. The prior art does not disclose any technological means to ensure in a homogeneous manner automatic grading of all the hides of the tanneries (F1, F2, F3, . . . , Fi) according to a homogeneous norm (NO) which would meet the needs of the different buyers (Ak), tanneries (Fi) and industrial integrators (Alk), in terms of grade parameter (G) of transaction (Ta, Tb, Tc) requests (TRA) for hides (1Sa, 1Sb, 1Sc). Each player in the sector, tannery, industrial integrator, has its own norm (NO).

In addition, the prior art does not feature technological means that allow tanneries (F1, F2, F3, . . . ) to respond in a uniform manner to multiple volume parameters (PV), complementary parameter (PC), and needs for optimization of requests (TRA) for transactions (Ta, Tb, Tc) from buyers (Ak), tanneries and industrial integrators, for hides (1Sa, 1Sb, 1Sc).

So that each buyer (Ak) must at each stage of the transaction (Ta, Tb, Tc, Td) perform a manual comparison of the products from the various potential supplying tanneries (Fi) whose specifications are inhomogeneous, using Excel files (42a, 42b, 42c, 42d) and E-mail exchanges (43a, 43b, 43c, 43d) and source the batch from different tanneries. This is very costly and undermines fluidity, productivity and development of the leather industry, as well as the price setting rationality.

Figure 9:
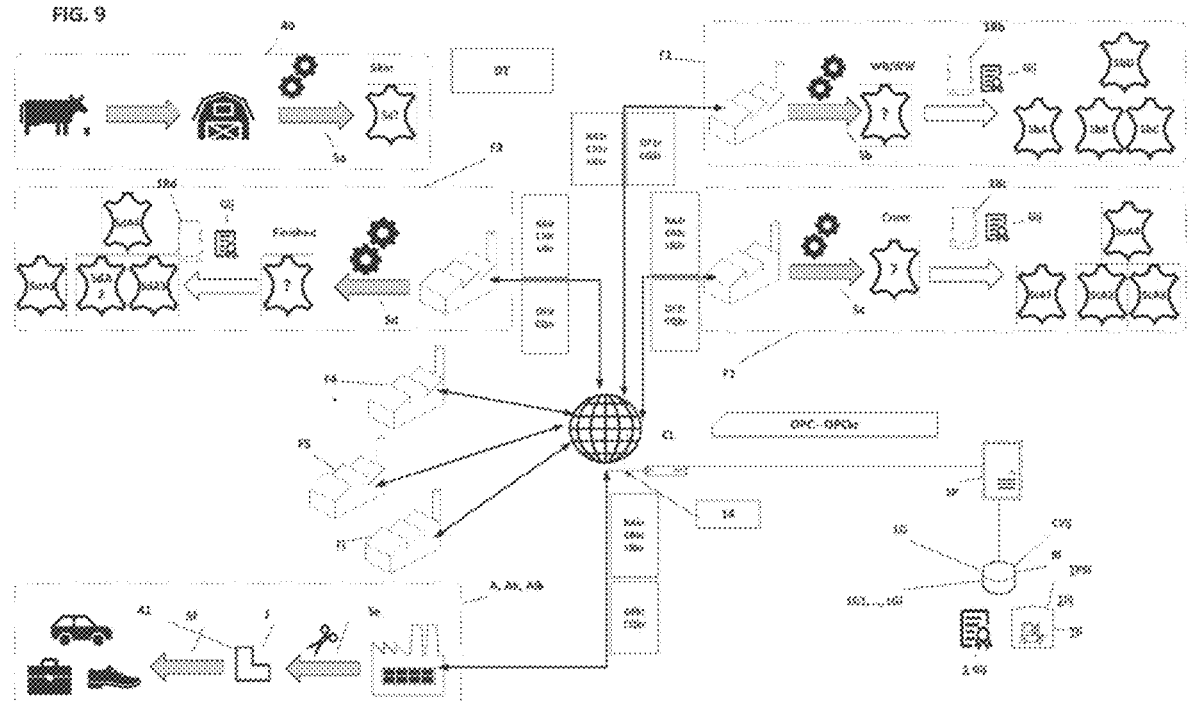
FIG. 9 is a diagram of the different stages in the tanning process and of the hide transaction process according to the method of the invention.

With reference to figure [FIG. 9], the different stages of the tanning process (Sa, Sb, Sc, Sd) and the different transaction stages (Ta, Tb, Tc, Td) of the hides within the ecosystem (E) of the tanning device (DT) organized according to the invention around the online trading platform (CL), can be seen. Each tannery (F1, . . . , Fi) is provided with computer means and software for producing primary images (18b, 18c, 18d). Thanks to the means of the invention described above with reference to figures [FIG. 1] to [FIG. 5], the evolving multitude of grades ($\Sigma Gij$) of all the offered products ($\Sigma 1ij$) at each transformation tanning stages (Sb, Sc, Sd) by all tanneries (F1, F2, F3, . . . ), with reference to the stock parameters ($\Sigma PSi$) of their factories (Fi), is dynamically memorized and updated into the inventory database (BI) of the inventory server (BI) of the platform (CL), according to a single homogeneous norm (NO) available to all tanneries and to all buyers in the ecosystem (E). At the end of each transformation stage of the tanneries (Sb, Sc, Sd), the buyers (Ak), tanneries or industrial integrators, send to the platform (CL) via the Internet network (14) their purchase requests (RAir) and their set of request criteria (CRir), including their grade parameter (G), their volume parameter (PV), their complementary parameter (PC) and their optimization parameter (PO).

Thanks to the standardized implementation of the parametric optimization process (OPC, OPCkr) of the invention, the platform (CL) provides each buyer (Ak) and for each purchase request (RAkr) an offer (OFkr) respecting all of its specific request criteria (CRir), by pooling the supply of an offered batch (LOkr) between the different tanneries (Fi) in an optimized manner according to the set of request criteria (CRir), and by providing a batch quality certificate (CQkr). According to this organization of the method according the invention, the transactions (Tb, Tc, Td) at each transformation step (Sb, Sc, Sd) are performed online in an automatic digital manner, without requiring tedious comparison work by the buyer (Ak) between the various supplying tanneries (Fi) with an Excel or Email type of file, and without involving the supplying tanneries (Fi) during the transaction.

Hence a significant gain in productivity. The transactions (Tb, Tc, Td) take place in an optimal manner with regard to the request criteria (CRir) of the buyer, under optimal price conditions for the supplying tanneries (Fi) and for the buyers (Ak).

INDUSTRIAL APPLICATIONS AND ADVANTAGES OF THE INVENTION

The invention has industrial applications in all transformation industries for transforming raw products having random topological and/or geometric defects and quality.

The main industrial application of the invention is the multi-site parametric optimization, for the constitution of optimized combined offered batches of tannery products, complying with a set of buyer request criteria within a tannery device including a trading platform and a multitude of interconnected tanneries.

The invention improves the productivity of supplying factories and buyers, reduces factory stocks, increases fluidity and the rationality of transaction prices. It reduces production costs by eliminating the need for visual controls. It allows online tracking by buyers of the products and suppliers history. It reduces the defect rate of raw products and quality defects of the finished products in which they are integrated. It allows the implementation of a process for quality assurance and history by the industrial integrators, by the issuance of a quality certificate for each combined offered batch and the online provision of production and quality control data. The invention permits automating both controlling and grading as well as product transactions for large volumes.

The invention claimed is:
1. An industrial tannery system (DT), configured for constitution and supply of an optimal batch (LOkr) of tannery hides ($1ij$) of homogeneous grade (Gkr), issued from multiple tanneries, intended to enhance the productivity of a later transformation stage (Sz) by an industrial integrator (Ak), the system comprising:
   a computer network (RL) for digital linking;
   a platform (CL), online on the internet, connected to the computer network (RL);
   a server configured to:
   digitally receive and process an alphanumeric Request (RAkr) made by the Industrial Integrator (Ak), the alphanumeric request defining in alphanumeric form request criteria (CRkr) for performing the transformation stage (Sz), including: a) the batch size (SR) set by a volume parameter (PVkr), b) a requested homogeneous grade (Gkr), and c) an overall numerical constraint parameter (PN) to be optimized, of all the hides combined in the batch, set by a complementary criterion (PC, SFV, EPV);
   at least two tanneries (F1, F2, Fi), inter connected via the computer network (RL) remote from one another, and from the platform (CL), each tannery of the at least two tanneries (F1, F2, Fi), ensuring tannery chemical processing (Sa, Sb, Sc, Sd) with a random quality of hides ($1ij$);
   an image digitizing scanner ($19i$) for producing primary images ($18i$) of hides equipping each of the at least two tanneries, both connected to the computer network (RL), and a factory computer server configured to carry out automatic digital optical acquisition (TODij) of a raw primary image file (FBij) by scanning each of the hides ($1ij$) to be graded from the tannery (Fi);

a memory of a factory inventory database (Bi) configured for storing primary images (20i), connected to the computer network (RL), including the factory computer server configured to:
  record the primary image files (FBij) of the hides (1ij) from each tannery (Fi) in the memory of the factory inventory database (Bi);
  perform automatic digital processing by shape recognition (TNFij) of primary image files (FBij) of each hide (1ij) to be graded, and identify topological identifiers (ITij) within the primary image files (FBij), representing the type and position of the topological defects in the hides (1ij), and generate a vector secondary image file (FSij) for each Hide (1ij);
a shape processing computer server (SF), connected to the computer network (RL), including a topological database (BF) in which the secondary image files (FSij) are stored;
a grading computer server (SG)
configured to dynamically:
  perform a programmed digital Grading Process (TDGij) to determine the topological quality Grade (Gij) of the hides (1ij) from their secondary image file (FSij), and store grades (Gij) into a grades database (BG) within the grading computer server (SG)
the platform (CL) configured to filter hides (1ij) by grade available from at least two tanneries (F1, F2, Fi), according to a complying selection process (TSCkr), configured to select the combined subset (SCkr) of the hides (1ij) complying with the requested Grade (Gkr) specified in the request (RAkr), the subset comprising a combination of a multitude of complying fractions (FC1, ..., FCi) of hides (1ij) of grade (Gkr), each from one of the at least two different tanneries (F1, F2, Fi);
a platform server of the platform (CL), configured to perform an under-constraint parametric optimization (OPCkr) by digital processing of the selections of the combined batches of hides (1ij) originating from the at least two tanneries (F1, F2, Fi), under constraint of numerical constraint Parameter (PN) to be optimized, defined by the request (RAkr), and to this effect:
a) iteratively perform selections, each selection comprising a collection of size (SR), parametrized by a variable numeric n-tuple (N(x)), defining and variably combining a plurality of complying sub-fractions (Si1, ..., Sim), each extracted from complying fractions (FC1 ..., FCi) within the combined subset (SCkr) of hides from the at least two tanneries (F1, F2, Fi)
b) determine, for each generated numerical n-tuple (N(x)), and therefore for each combined selection of complying sub-fractions (Si1, ..., Sim) of the at least two tanneries (F1, F2, Fi), the value reached of the numerical constraint parameter (PN) of all the Hides combined within the selection, and,
c) constitute the optimized batch (LOkr), by the solution made of a selection that reaches the numerical optimum, either the minimum value or the maximum value, of the numerical constraint parameter (PN) among all hides.

* * * * *